(12) United States Patent
Ingvarsson

(10) Patent No.: US 6,364,587 B1
(45) Date of Patent: Apr. 2, 2002

(54) DEVICE FOR PREVENTING ANTI-ROTATION OF A FASTENING ELEMENT

(75) Inventor: Henrik Ingvarsson, Onsala (SE)

(73) Assignee: Volvo Lastvagnar AB (SE)

( * ) Notice: Subject to any disclaimer, the term of this patent is extended or adjusted under 35 U.S.C. 154(b) by 0 days.

(21) Appl. No.: 09/194,302
(22) PCT Filed: May 23, 1997
(86) PCT No.: PCT/SE97/00853
 § 371 Date: Mar. 22, 1999
 § 102(e) Date: Mar. 22, 1999
(87) PCT Pub. No.: WO97/45648
 PCT Pub. Date: Dec. 4, 1997

(30) Foreign Application Priority Data

May 24, 1996 (SE) ................................. 9602052

(51) Int. Cl.⁷ .................................................. F16B 39/10
(52) U.S. Cl. ........................................ 411/116; 411/121
(58) Field of Search ................................ 411/119, 120, 411/121, 166, 512, 525, 526, 533, 970, 999, 116–118

(56) References Cited

U.S. PATENT DOCUMENTS

| | | | | |
|---|---|---|---|---|
| 1,788,408 A | * | 1/1931 | Raybould | |
| 2,252,379 A | * | 8/1941 | Johns | 411/119 |
| 2,472,394 A | * | 6/1949 | Barraket | 411/119 |
| 2,798,770 A | * | 7/1957 | Terrick | 411/116 |
| 2,921,655 A | * | 1/1960 | McGregor | 411/116 |
| 3,640,326 A | | 2/1972 | Brown | |
| 4,056,893 A | * | 11/1977 | Willard | 411/166 |
| 4,906,150 A | * | 3/1990 | Bennett | 411/120 |
| 5,297,693 A | * | 3/1994 | Perkey | 411/121 |

FOREIGN PATENT DOCUMENTS

| | | | | |
|---|---|---|---|---|
| DE | 812131 | * | 8/1951 | 411/116 |
| GB | 158316 | * | 1/1921 | 411/116 |
| NO | 66300 | | 6/1943 | |
| SE | 35439 | * | 9/1913 | 411/116 |
| SE | 420 438 | | 10/1981 | |
| NL | 89 | * | 1/1914 | 411/119 |

* cited by examiner

Primary Examiner—Flemming Saether
(74) Attorney, Agent, or Firm—Lerner, David, Littenberg, Krumholz & Mentlik, LLP

(57) ABSTRACT

Devices are disclosed for locking rotatable fasteners in a construction element including a shaped surface which defines an axis of rotation for the rotatable fastener, and at least one protrusion extending into the shaped surface as a lock for the rotatable fastener, in which the protrusion can be processed with respect to the axis of rotation of the rotatable fastener to create an end surface on the protrusion which is a predetermined distance from the axis of rotation of the rotatable fastener irrespective of the location of the axis of rotation relative to the shaped surface. Methods for producing such devices are also disclosed.

6 Claims, 3 Drawing Sheets

DEVICE FOR PREVENTING ANTI-ROTATION OF A FASTENING ELEMENT

The present invention relates to a device for rotational locking of a fastening element. More particularly, the present invention relates to a device which functions as a lock or a shoulder for fastening elements, such as bolts or screws which are arranged in cast or forged materials. Still more particularly, the present invention relates to a method for producing such a device.

BACKGROUND OF THE INVENTION

Construction elements such as forged beams and attachment consoles in, for example, motor vehicles often comprise through holes for bolts and similar fastening elements. These fastening elements can be used to attach various components to the beam or the attachment console.

In connection with heavy cargo vehicles, for example, such attachment consoles are often utilized for attaching heavy components, such as for attaching the front axle of the vehicle. For this purpose the attachment console can be made from a cast or forged material, for example nodular iron.

FIG. 1 shows a top view of a section of a previously known construction element in the shape of an attachment console 1, which according to conventional technology is shaped by casting. The attachment console 1 comprises a recess 2, which has been shaped during the casting process. At the bottom of the recess 2, there is a through hole 3. The arrangement is also explained by FIG. 2, which shows a cross-sectional view of the attachment console 1. The hole 3 is intended for an attachment element in the form of a bolt 4. The inner side walls of the recess 2 are dimensioned with somewhat larger inner dimensions than the outer dimensions of the head 5 of the bolt 4. In this way, these side walls can serve as a lock or a shoulder for the bolt 4, so that it will not rotate when it is attached by means of a nut 6 or a similar component at the rear side of the attachment console 1.

Although the above-mentioned arrangement functions relatively satisfactorily for locking the bolt 4, it has a serious drawback in that the hole 3 in the recess 2 must be positioned and drilled with a very high degree of accuracy. If the position of the hole 3 deviates too much sideways from the line of symmetry in the bottom surface of the recess 2, the head 5 of the bolt 4 cannot be housed in the recess 2, i.e. it will simply not be possible to bring the bolt 4 down into the hole 3. This, in turn, means that very high demands must be made on the manufacturing and processing of the attachment console 1, where in particular very high tolerances are demanded when drilling the hole 3. This of course leads to time- and cost-consuming measures, which are not desirable.

The object of the present invention is to obtain an improved device for rotational locking of a fastening element, such as a screw, a bolt or a nut in a construction element, which device both provides for secure locking of the fastening element and permits a relatively high tolerance when drilling said hole.

A further object of the present invention is to provide a process for manufacturing the above-mentioned arrangement.

SUMMARY OF THE INVENTION

In accordance with the present invention, these and other objects have now been realized by the invention of a device for locking a rotatable fastening element in a construction element comprising a shaped surface disposed in the construction element, the shaped surface defining an axis of rotation for the rotatable fastening element, and a locking member for the rotatable fastening element comprising at least one protrusion extending into the shaped surface, whereby the at least one protrusion may be processed with respect to the axis of rotation of the rotatable fastening element to create an end surface on the at least one protrusion which is a predetermined distance from the axis of rotation of the rotatable fastening element irrrespective of the location of the axis of rotation relative to the shaped surface. In a preferred embodiment, the shaped surface includes a through hole extending through the construction element, the through hole corresponding to the axis of rotation of the rotatable fastening element.

In accordance with one embodiment of the device of the present invention, the shaped surface comprises a recessed portion of the construction element. In a preferred embodiment, the at least one protrusion comprises a plurality of protrusions, whereby the axial surfaces of each of the plurality of protrusions is located the predetermined distance from the axis of rotation of the rotatable fastening element. In a more preferred embodiment, the recessed portion includes an inner wall, and each of the plurality of protrusions extends from the inner wall towards the axis of rotation of the rotatable fastening element. Preferably, each of the plurality of protrusions is disposed an equal distance from every other of the plurality of protrusions.

In accordance with another embodiment of the device of the present invention, the construction element is cast, forged and sintered material. In another embodiment, the construction element is a console of a motor vehicle.

In accordance with the method of the present invention, a method has been provided for producing a device for locking a rotatable fastening element in a construction element, the method comprising forming a shaped surface in the construction element, the shaped surface including an axis of rotation for the rotatable fastening element, forming at least one protrusion from the shaped surface of the construction element towards the axis of rotation of the rotatable fastening element, and processing the at least one protrusion to provide an end surface on the at least one protrusion a predetermined distance from the axis of rotation of the rotatable fastening element irrespective of the location of the axis of rotation with respect to the shaped surface. In a preferred embodiment, the method includes providing a through hole in the construction element at a location in the shaped surface corresponding to the axis of rotation of the rotatable fastening element.

In accordance with one embodiment of the method of the present invention, the shaped surface comprises a recessed portion of the construction element.

In accordance with another embodiment of the method of the present invention, the forming of the at least one protrusion comprises forming a plurality of the protrusions, and the processing step comprises processing the plurality of protrusions whereby the end surfaces of each of the plurality of protrusions is the predetermined distance from the axis of rotation of the rotatable fastening element. In a preferred embodiment, forming of the shaped surface comprises casting or forging. In another embodiment, forming of the at least one protrusion comprises casting or forging.

In accordance with another embodiment of the method of the present invention, processing of the plurality of protrusions comprises milling.

The present invention thus provides a device for locking, in the direction of rotation, a rotatable fastening element in a construction element, e.g. a fastening console. The present invention comprises a recessed part formed in the construction element, in which recessed part a hole is made, and where the recessed part also comprises means for locking of the fastening element. According to the present invention, that means comprise at least one protruding element which has been formed in the bottom surface of the recessed part, which protruding element is shaped with an edge surface which faces the hole and which has been positioned at a predetermined distance from the center of the hole.

Since the hole can now be drilled with a low degree of accuracy, a construction element can now be produced at a low cost.

The term "fastening element" in this context refers to screws, bolts and similar components which are intended for rotatable or screwable positioning through a hole in a construction element, e.g. a fastening console. This term also refers to nuts and similar components which are intended to interact with screws or similar components.

BRIEF DESCRIPTION OF THE FIGURES

The present invention will now be described more clearly with reference to the following detailed description, which, in turn, refers to the appended drawings, where.

DETAILED DESCRIPTION

Figure 1:
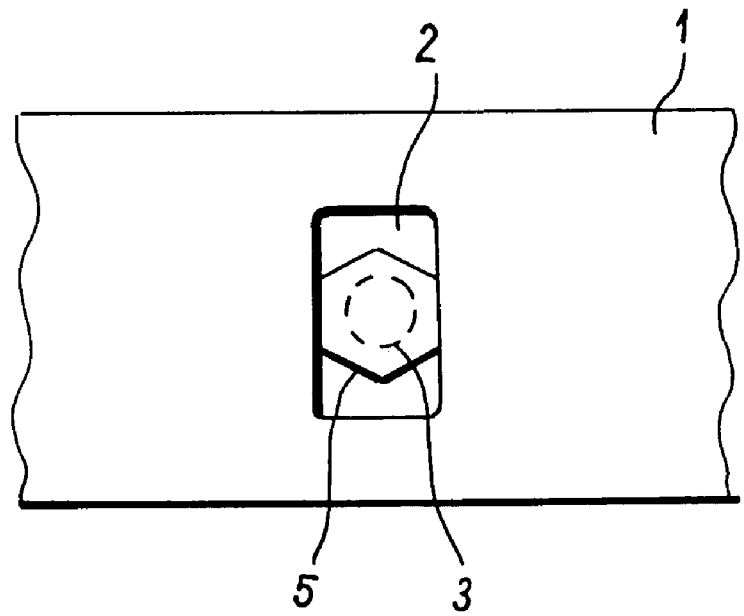
FIG. 1 is a top, elevatational, perspective view of a previously known device for locking a screw.
Figure 2:
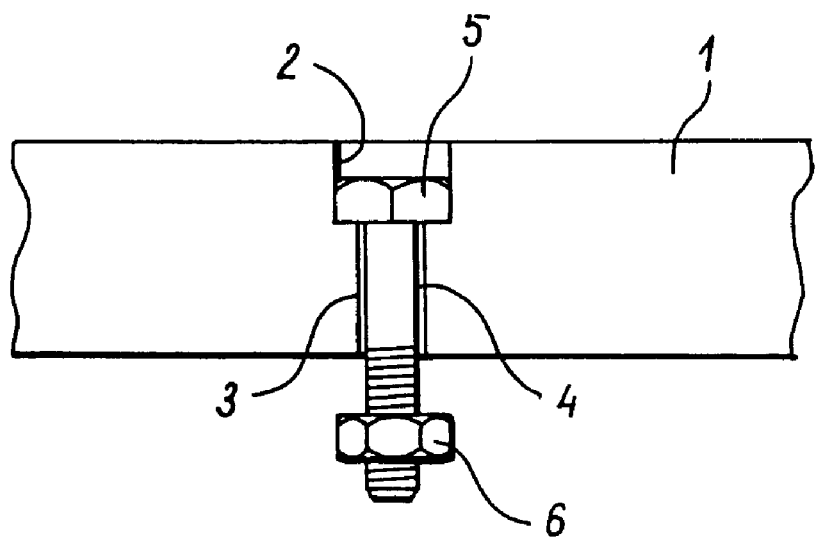
FIG. 2 is a side, elevational, cross-sectional view of the previously known device shown in FIG. 1.
Figure 3:
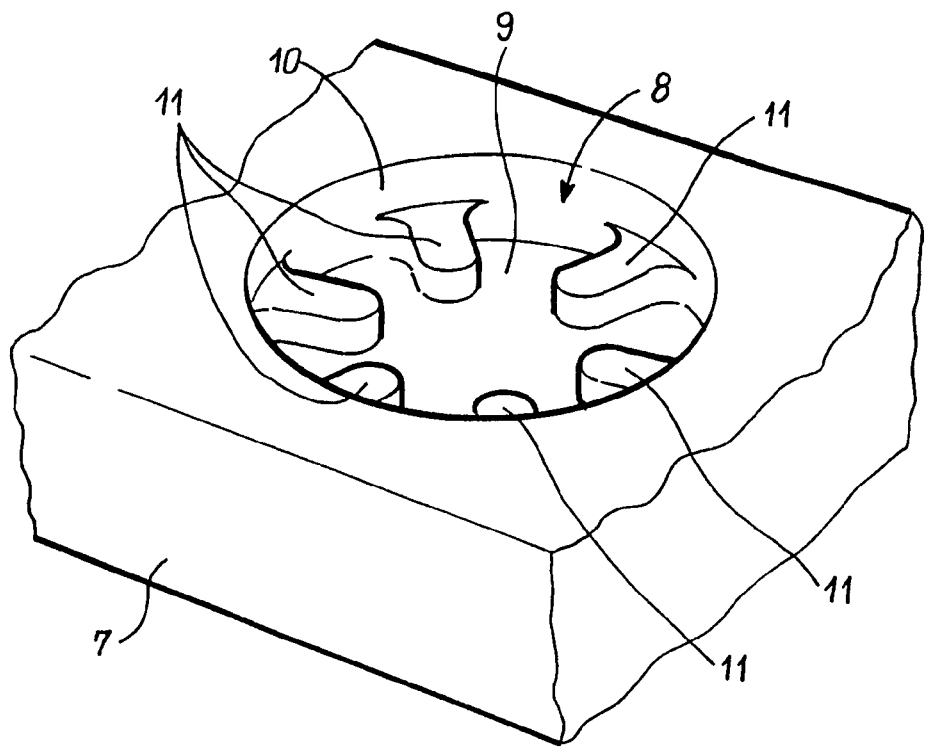
FIG. 3 is a top, perspective view of the device according to the present invention after a first manufacturing step.

Referring to the Figures, in which like reference numerals refer to like elements thereof, FIG. 3 shows a perspective view of a part of a construction element in the form of an essentially longitudinal fastening console 7, which for example has been made from cast nodular iron. The present invention is primarily, but not exclusively, intended to be a part of a fastening console 7 for attaching the axis of a wheel of a cargo vehicle. According to a preferred embodiment, the present invention is manufactured in three main manufacturing steps. FIG. 3 shows the device according to the present invention after the first of these three steps, which preferably consists of a casting process during which the attachment console 7 is shaped with a recessed part 8. Seen from above, the recessed part 8 has an essentially circular form. Furthermore, the recessed part 8 is shaped with a bottom edge 9 and an essentially vertical inner side wall 10.

Furthermore, the recessed part 8 is formed during the casting in such a way that a plurality of protruding elements 11, preferably six, are formed on the bottom surface 9 of the recessed part 8. The protruding elements 11 are shaped as bars or protrusions which have their extension from the side wall 10 and towards the center of the recessed part 8. The protrusions 11 are preferably arranged at equal distances from each other along the side wall 10. The surface inside the protrusions 11 in this way forms a surface shaped for a fastening element.

Figure 4:
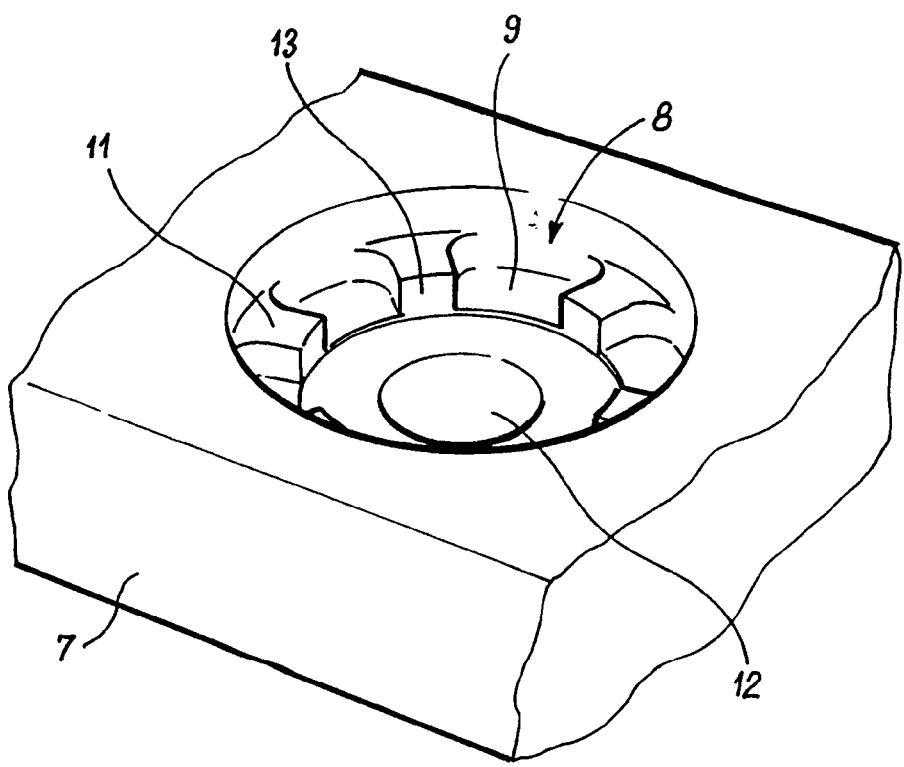
FIG. 4 is a top, perspective view of the device according to the invention after a further manufacturing step.

When the console 7 has been formed with the protrusions 11, a hole is drilled essentially in the center of the recessed part 8. FIG. 4 shows a perspective view in which this hole 12 can be seen. The hole 12 is intended to admit a bolt or a similar fastening element. Furthermore, according to a third manufacturing step, the end surface 13 of the respective protrusions 11 are processed. In this manner, the respective protrusions 11 are somewhat shortened, by means of which the distance from the center of the hole 12 to all of the end surfaces 13 of the protrusions 11 becomes essentially equal. This processing can be made using known technology, e.g. by means of a (not shown) milling tool which can comprise a peg which protrudes down into the hole 12 and including a part which essentially works in a circular pattern, with a larger radius than the radius of the hole 12 (i.e. a radius corresponding to the distance from the center of the hole 12 to the respective end surfaces 13). During this process, the end surfaces 13 are shaped so that they become slightly curve-shaped.

The principal reason that the protrusions 11 need to be processed separately so that the end surfaces 13 are formed is that the casting process does not permit sharp edges and similar details to be formed in the console 7.

In one embodiment of the present invention, drilling of the hole 12 and the processing of the protrusions 11 can be carried-out in one single step. This can, in this case, be effected by means of a suitable tool with a combined drilling and milling function.

If a screw (not shown in FIG. 4) is brought down into the hole 12, each side of the screw head will be positioned in front of one end edge 13 of the respective protrusions 11. If the screw is caused to rotate, e.g. when a nut is screwed onto the screw at the rear side of the console 7, the screw will turn until the respective sides of the screw head are blocked by a protrusion 11. In this way, each end surface 13 serves as a stopping element or a shoulder which prevents further rotation of the screw.

The basic principle of the present invention is based on the fact that the drilling of the hole 12 can be carried out with a relatively low degree of accuracy. This is now possible since the end surfaces 13 are processed so that their distances to the center of the hole 12 become essentially equal, which in turn causes the position of a positioned screw to always be related to the end surf aces 13 and not to the side wall 10 of the recessed part 8. This principle of the present invention will become apparent from FIGS. 5 and 6, which show views from above of the recessed part 8 in which a screw has been positioned.

Figure 5:
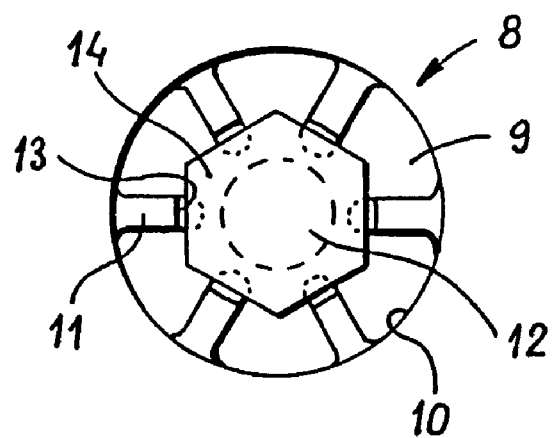
FIG. 5 is a top, elevational view of the device of FIGS. 3 and 4, in which the positioning of a screw is apparent.

FIG. 5 shows a case where the hole 12 has been drilled essentially in the center of the recessed part 8. Furthermore, the six protrusions 11 have been processed so that they have been shaped with one edge surface 13 each. Since the tool which is utilized to process the end surfaces 13 is normally of a circular shape, the end surfaces 13 become slightly curve-shaped. For reasons of clarity, FIG. 5 also shows—with broken lines—the initial shape of the protrusions 11, i.e. the shape they have after the initial casting process (see FIG. 3).

When positioning a screw through the hole 12, the screw will be brought into place so that its head 14 rests on the bottom surface 9 of the recessed part 8. The six protrusions 11 have a certain vertical extension as seen from the bottom surface 9, which extension is suitably adapted to the height of the screw head 14. The screw defines an axis of rotation through the console 7 which essentially coincides with the extension of the hole 12. When the screw head 14 is rotated, which normally takes place when attaching a nut or the like on the underside of the hole 12, each side of the screw head 14 will be in contact with one protrusion 11. In this way, a locking against rotation of the screw head 14 is obtained.

Figure 6:
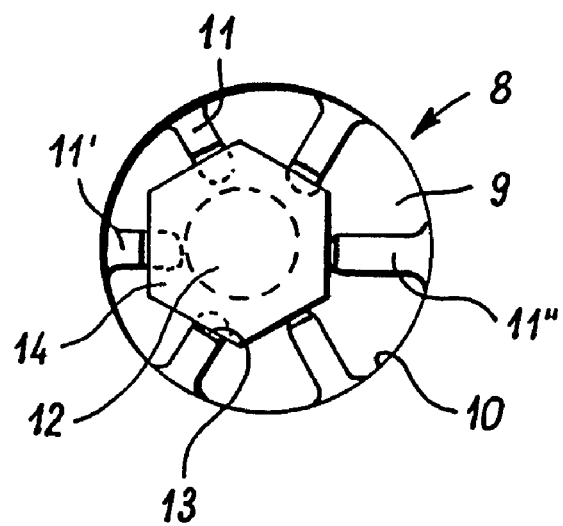
FIG. 6 is a further top, elevational view of the device according to FIGS. 3 and 4.

FIG. 6 shows a case where drilling of the hole 12 has been carried out with a relatively high degree of inaccuracy. The figure, in similarity to FIG. 5, shows the recessed part 8, with the difference in this case that the hole 12 in FIG. 6 has been drilled a certain distance from the center of the recessed part 8. This has caused the hole 12 to be positioned a distance to the left in the figure relative to the center of the recessed part 8.

As has been explained above, the processing of each protrusion 11 is carried out such that the radius from the center of the hole 12 to each end plane 13 is essentially equal for all of the protrusions 11. This means that there will always be enough room for the screw head 14 to be locked against rotation (provided that said radius is adapted to the dimensions of the screw head 14) although the drilling of the hole 12 hag been carried out with large tolerances.

Each protrusion 11 thus has an edge 13 which faces the screw head 14, which will come into contact with the respective side of the screw head 14 during rotation of the screw. As can be seen in FIGS. 5 and 6, the protrusions are shaped in such a manner that the edges 13 are positioned at a predetermined distance to the axis of rotation of the screw, essentially independently of the position of the axis of rotation on the bottom surface 9.

Since the position of the hole 12 is displaced from the center of the recessed part 8, the protrusion 11' which is shown at the extreme left in FIG. 6 will be processed to a relatively great extent. In a corresponding manner, the protrusion 11" which is shown at the extreme right in FIG. 6 will be processed to a relatively small extent. This fact, however, does not affect the locking of the screw head 12 between the protrusions 11, since the distance between the center of the hole 12 and the respective end surfaces 13 is always essentially equal essentially independently of the position of the hole 12 inside the recessed part 8.

FIG. 6 also shows with broken lines the shape of the protrusions 11 immediately following the casting process. The part of each protrusion 11 which is indicated with broken lines will thus be removed during the abovementioned processing.

The invention is not limited to the above-described embodiments but can be varied within the scope of the appended claims. For example, the recessed part 8 can be circular but also oval or with some other geometrical shape.

Although FIGS. 3–6 show six protrusions 11 with six end surfaces 13, which would indicate that the invention is suitable for hexagonal screw heads, it can also be utilized in connection with fastening elements with more or fewer sides than six. The number of protrusions 11 can also vary. Preferably, the number of protrusions matches the number of sides of the attachment element which is intended to be locked, but the present invention can also be utilized in cases where the number of protrusions is not equal to the number of sides of the attachment element in question.

The present invention is particularly well suited for cast, forged and sintered materials, e.g. nodular iron or corresponding iron-based materials. The present invention is also suitable for light metals, e.g. aluminum or other metals and metal alloys. In principle, the present invention can also be utilized together with non-metal materials, e.g. plastic materials.

The protrusions 11 can be shaped in various manners. However, they must be arranged relative to the surface intended for the fastening element, so that they form a stop element which prevents rotation of the fastening element. Although the figures show an embodiment where the protrusions 11 have been positioned in a recessed part 8, the present invention can also be utilized in construction elements without a recessed part, i.e. where the protrusions 11 are, for example, arranged on top of the construction element. In this case, the protrusions 11 can be arranged in an arbitrary position on the construction element where there is a need to lock a fastening element.

The present invention can also be utilized when locking a fastening element when there is no hole made through the console 7.

Finally, the processing of the end surfaces 13 of the protrusions 11 can be made by means of a milling tool or other kinds of tools.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Apparatus for locking a rotatable fastening element comprising a construction element having a shaped surface comprising a recessed portion of said construction element, said recessed portion including an inner wall and a bottom wall, said shaped surface defining an interior, disposed in said construction element, said shaped surface defining an axis of rotation for said rotatable fastening element, and a locking member for said rotatable fastening element comprising at least one protrusion extending from said shaped surface into said interior of said surface, said at least one protrusion extending along said bottom wall thereof, whereby said at least one protrusion protrudes into said interior of said shaped surface a sufficient distance such that said protrusion is processed with respect to said axis of rotation of said rotatable fastening element to create an end surface on said at least one protrusion which is at a predetermined distance from said axis of rotation of said rotatable fastening element irrespective of the location of said axis of rotation relative to said shaped surface.

2. The apparatus of claim 1 wherein said shaped surface includes a through hole extending through said construction element, said through hole corresponding to said axis of rotation of said rotatable fastening element.

3. The apparatus of claim 1 wherein said at least one protrustion comprises a plurality of said protrusions, whereby said axial surfaces of each of said plurality of protrusions is located said predetermined distance from said axis of rotation of said rotatable fastening element.

4. The apparatus of claim 3 wherein each of said plurality of protrusions is disposed an equal distance from every other of said plurality of protrusions.

5. The apparatus of claim 1 wherein said construction element is selected from the group consisting of cast, forged and sintered material.

6. The apparatus of claim 1 wherein said construction element comprises a console of a motor vehicle.

* * * * *